(12) United States Patent
Smithson et al.

(10) Patent No.: US 8,865,293 B2
(45) Date of Patent: Oct. 21, 2014

(54) OPTICALLY ACTIVE MATERIALS AND ARTICLES AND SYSTEMS IN WHICH THEY MAY BE USED

(75) Inventors: Robert L. W. Smithson, Mahtomedi, MN (US); Rolf W. Biernath, Wyoming, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 916 days.

(21) Appl. No.: 12/335,175

(22) Filed: Dec. 15, 2008

(65) Prior Publication Data

US 2010/0151213 A1    Jun. 17, 2010

(51) Int. Cl.
*G02B 5/124* (2006.01)
*B60R 13/10* (2006.01)

(52) U.S. Cl.
CPC ...................................... *B60R 13/10* (2013.01)
USPC ......................... 428/195.1; 359/530; 359/533

(58) Field of Classification Search
CPC .......... B60R 13/10; G06K 9/20; G02B 5/128; G02B 5/0816; G02B 5/08; G02B 5/04
USPC ............. 428/195.1; 235/468, 462.01, 462.14, 235/462.22; 359/530, 533, 537.529; 40/542
See application file for complete search history.

(56) References Cited

U.S. PATENT DOCUMENTS

| | | | |
|---|---|---|---|
| 1,591,572 | A | 7/1926 | Stimson |
| 3,190,178 | A | 6/1965 | McKenzie |
| 3,758,193 | A | 9/1973 | Tung |
| 4,025,159 | A | 5/1977 | McGrath |
| 4,588,258 | A | 5/1986 | Hoopman |
| 4,767,571 | A | 8/1988 | Suzuki et al. |
| 4,775,219 | A | 10/1988 | Appeldorn et al. |
| 4,847,237 | A | 7/1989 | Vanderzanden |
| 5,066,098 | A | 11/1991 | Kult et al. |
| 5,138,488 | A | 8/1992 | Szczech |
| 5,450,235 | A | 9/1995 | Smith et al. |
| 5,508,105 | A | 4/1996 | Orensteen et al. |
| 5,522,623 | A | 6/1996 | Soules et al. |

(Continued)

FOREIGN PATENT DOCUMENTS

| | | |
|---|---|---|
| EP | 0416742 A2 | 3/1991 |
| EP | 416742 A2 * | 3/1991 |

(Continued)

OTHER PUBLICATIONS

International Search Report for PCT/US2009/065792 prepared by the Korean Intellectual Property Office.

(Continued)

*Primary Examiner* — Mark Ruthkosky
*Assistant Examiner* — Laura C Powers

(57) ABSTRACT

The inventors of the present application developed novel optically active materials, methods, and articles. One embodiment of the present application is an optically active article, comprising: an infrared-reflecting material positioned adjacent to an optically active substrate such that the infrared-reflecting material forms a pattern that can be read by an infrared sensor when the optically active substrate is illuminated by an infrared light source. Another embodiment of the present application relates to a method of manufacturing an optically active article, comprising: obtaining an optically active sheeting; and positioning an infrared-reflecting material on the optically active sheeting to form a pattern. The optically active article may be, for example, a license plate.

7 Claims, 3 Drawing Sheets

(56) References Cited

U.S. PATENT DOCUMENTS

| | | | |
|---|---|---|---|
| 5,557,836 | A | 9/1996 | Smith et al. |
| 5,734,343 | A | 3/1998 | Urbish et al. |
| 5,818,492 | A | 10/1998 | Look |
| 5,897,738 | A | 4/1999 | Rajan et al. |
| 6,024,455 | A | 2/2000 | O'Neill et al. |
| 6,157,486 | A | 12/2000 | Benson, Jr. et al. |
| 6,246,428 | B1 | 6/2001 | Look et al. |
| 6,288,842 | B1 | 9/2001 | Florczak et al. |
| 6,542,292 | B2 | 4/2003 | Onomichi et al. |
| 6,613,819 | B2 | 9/2003 | Johnson et al. |
| 6,712,532 | B2 | 3/2004 | Look |
| 6,832,728 | B2 * | 12/2004 | Kennedy ............ 235/468 |
| D511,187 | S | 11/2005 | Krasa |
| D517,610 | S | 3/2006 | Krasa |
| 7,018,714 | B2 | 3/2006 | Kobayashi et al. |
| 7,290,710 | B2 | 11/2007 | Betush et al. |
| 7,387,393 | B2 * | 6/2008 | Reich et al. ............ 359/529 |
| 7,728,931 | B2 * | 6/2010 | Hoffmuller ............ 349/117 |
| 2007/0082963 | A1 | 4/2007 | Bhatt |
| 2007/0129482 | A1 | 6/2007 | Kuvshinnikova et al. |
| 2007/0263057 | A1 | 11/2007 | Eiseman et al. |
| 2010/0092747 | A1 * | 4/2010 | Chung et al. ............ 428/220 |

FOREIGN PATENT DOCUMENTS

| | | |
|---|---|---|
| GB | 2206716 A | 1/1989 |
| GB | 2339785 A | 2/2000 |
| JP | 63/227597 | 9/1963 |
| JP | S58-181176 | 12/1983 |
| JP | 62/032132 | 2/1987 |
| JP | S62-177684 | 11/1987 |
| JP | 01/061492 | 3/1989 |
| JP | 02/029485 | 1/1990 |
| JP | 10-250498 | 9/1998 |
| KR | 20-0330360 | 10/2003 |
| KR | 20-0342618 | 2/2004 |
| WO | 95/17692 | 6/1995 |
| WO | 96/35196 | 11/1996 |
| WO | 2006/009873 | 1/2006 |
| WO | 2006/096258 A1 | 9/2006 |
| WO | WO 2006096258 A1 * | 9/2006 |
| WO | 2006/132502 | 12/2006 |
| WO | 2007/005357 A1 | 1/2007 |

OTHER PUBLICATIONS

Wikipedia, "Dichroic Filter," https://en.wikipedia.org/w/index.php?title=Dichroic_filter&oldid=242455716, Oct. 2, 2008.

* cited by examiner

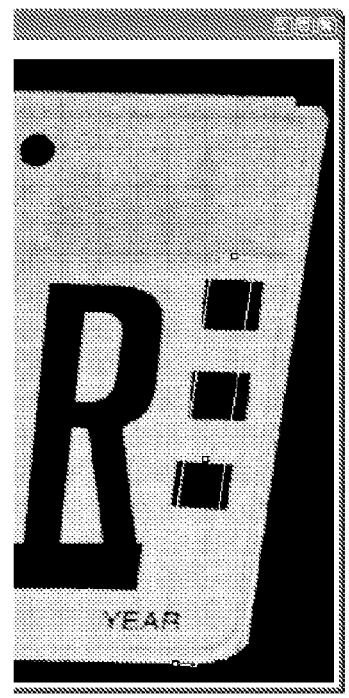
*Fig. 5A*  *Fig. 5B*
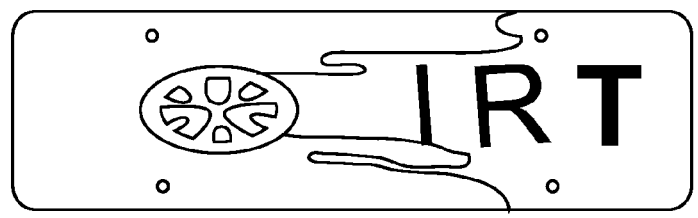
*Fig. 6*
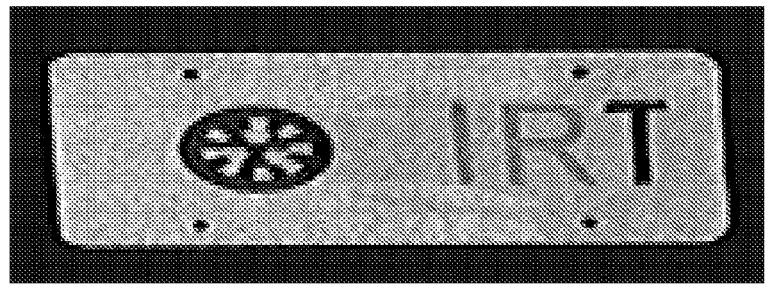
*Fig. 7*

OPTICALLY ACTIVE MATERIALS AND ARTICLES AND SYSTEMS IN WHICH THEY MAY BE USED

TECHNICAL FIELD

The present application relates generally to novel optically active articles; methods of making and using same; and systems in which the articles may be used.

BACKGROUND

Optimally, license plates have an overall similarity of styling or appearance that enables rapid recognition of license plates issued by various licensing authorities and that inhibits counterfeiting. At the same time, license plates should provide a distinct, individualized, and unique identifying code or image for each vehicle, state, or driver. To that end, many licensing authorities offer "vanity" license plates. Such plates allow the driver to select an attractive or meaningful design that will be printed on their license plate. The production of such "vanity" license plates results in each state offering numerous different license plate designs to its constituents.

The proliferation of these individualized license plates is significant. For example, the state of Oregon offers seven different license plate design options to standard vehicle drivers: tree, salmon, Crater Lake, cultural trust, amateur radio operator (ham), antique vehicle, and special interest. Also, the state of Oregon offers six types of non-profit plates to standard vehicle drivers: Lions Club, Oregon Masonic Family, Oregon Professional Firefighters, Oregon State Elks, Share the Road, and Support Our Troops plates. Additionally, the state of Oregon offers six types of high education plates to drivers of standard vehicles: Eastern Oregon University, Oregon State University, Portland State University, University of Oregon, University of Portland, and Willamette University. Further, the state of Oregon offers ten veteran and service-related plates to drivers of standard vehicles: Congressional Medal of Honor; Disabled Veteran; Ex-POW; First Marine Division; Gold Star Family; National Guard; Non-Commission Officers Association; Purple Heart; Veterans Recognition; and Vietnam Veterans. This results in a total of 33 different personalized plate options for standard vehicles in a single state. If each of the 50 states and each of the 10 Canadian provinces offer approximately the same number of options for standard vehicles, almost 2000 different design options for license plates are available. This does not even take into account the license plate options for mopeds, motorcycles, campers, trailers, trucks, commercial vehicles, government vehicles, dealer vehicles, and motor homes.

Meanwhile, automated enforcement systems, including, for example, electronic toll systems, red light running systems, speed enforcement systems, and access control systems, are becoming more prevalent. Many embodiments of such systems rely on an accurate reading of a vehicle's license plate, which is often performed by an automated license plate recognition system. However, obtaining an accurate reading of a vehicle's license plate is becoming increasingly difficult due to the wide variety of license plates now on the roads.

SUMMARY

License plates can be challenging for an automated license plate recognition system to read due to at least some of the following factors: (1) varying reflective properties of the license plate materials; (2) non-standard fonts, characters, and designs on the license plates; (3) varying embedded security technologies in the license plates; (4) variations in the cameras or optical character recognition systems; (5) the speed of the vehicle passing the camera or optical character recognition system; (6) the volume of vehicles flowing past the cameras or optical character recognition systems; (7) the spacing of vehicles flowing past the cameras or optical character recognition systems; (8) wide variances in ambient illumination surrounding the license plates; (9) weather; (10) license plate mounting location and/or tilt; (11) wide variances in license plate graphics; (12) the detector-to-license plate-distance permissible for each automated enforcement system; and (13) occlusion of the license plate by, for example, other vehicles, dirt on the license plate, articles on the roadway, natural barriers, etc.

The inventors of the present application sought to make license plate identification easier. More specifically, the inventors of the present application sought to improve the accuracy of license plate indicia identification, which may facilitate more accurate identification of, for example, the owner of the vehicle; the state or country where the license plate was issued; and the license plate type (e.g., commercial versus personal; car, truck, motorcycle).

One embodiment of the present application relates to an optically active article, comprising: an infrared-reflecting material positioned adjacent to an optically active substrate such that the infrared-reflecting material forms a pattern that can be read by an infrared sensor when the optically active substrate is illuminated by an infrared light source.

Another embodiment of the present application relates to a method of manufacturing an optically active article, comprising: obtaining an optically active sheeting; and positioning an infrared-reflecting material on the optically active sheeting to form a pattern.

Another embodiment of the present application relates to an optically active article, comprising: a multilayer optical film covering at least a portion of an optically active sheeting; and wherein the multilayer optical film exhibits a relatively high reflectance for light within a first spectral range and a relatively low reflectance for light within a second spectral range. In some embodiments, the first spectral range is between about 700 nm to about 1100 nm and the second spectral range is between about 400 nm to about 700 nm.

For all of these alternative embodiments, the optically active article may be, for example, a license plate, a validation sticker, a usage permit, an identification label, or a tag. Also, the optically active article can be applied to another article, such as, for example, a retroreflective tag applied to a signage. The optically active substrate may be, for example, reflective or retroreflective (such as, for example, beaded or prismatic retroreflective sheeting). The infrared-reflecting material may be, for example, a multilayer optical film or may be a material including an optically active dye or pigment. The pattern may include, for example, machine readable information, graphics, images, bar codes, alphanumeric characters, or other indicia.

BRIEF DESCRIPTION OF DRAWINGS

FIGS. 5A and 5B are digital photographs of a portion of the license plate of FIG. 4 taken with ambient visible light and with near-infrared light, respectively.

FIG. 6 is a schematic representation of the license plate of Example 3.

FIG. 7 is a digital photograph of the license plate of FIG. 6 taken with near infra-red light.

DETAILED DESCRIPTION

Various embodiments and implementations will be described in detail. These embodiments should not be construed as limiting the scope of the present application in any manner, and changes and modifications may be made without departing from the spirit and scope of the inventions. For example, many of the embodiments, implementations, and examples are discussed with specific reference to license plates, but these should not be construed to limit the application scope to this one exemplary implementation. Further, only some end uses have been discussed herein, but end uses not specifically described herein are included within the scope of the present application. As such, the scope of the present application should be determined by the claims.

Figure 1:
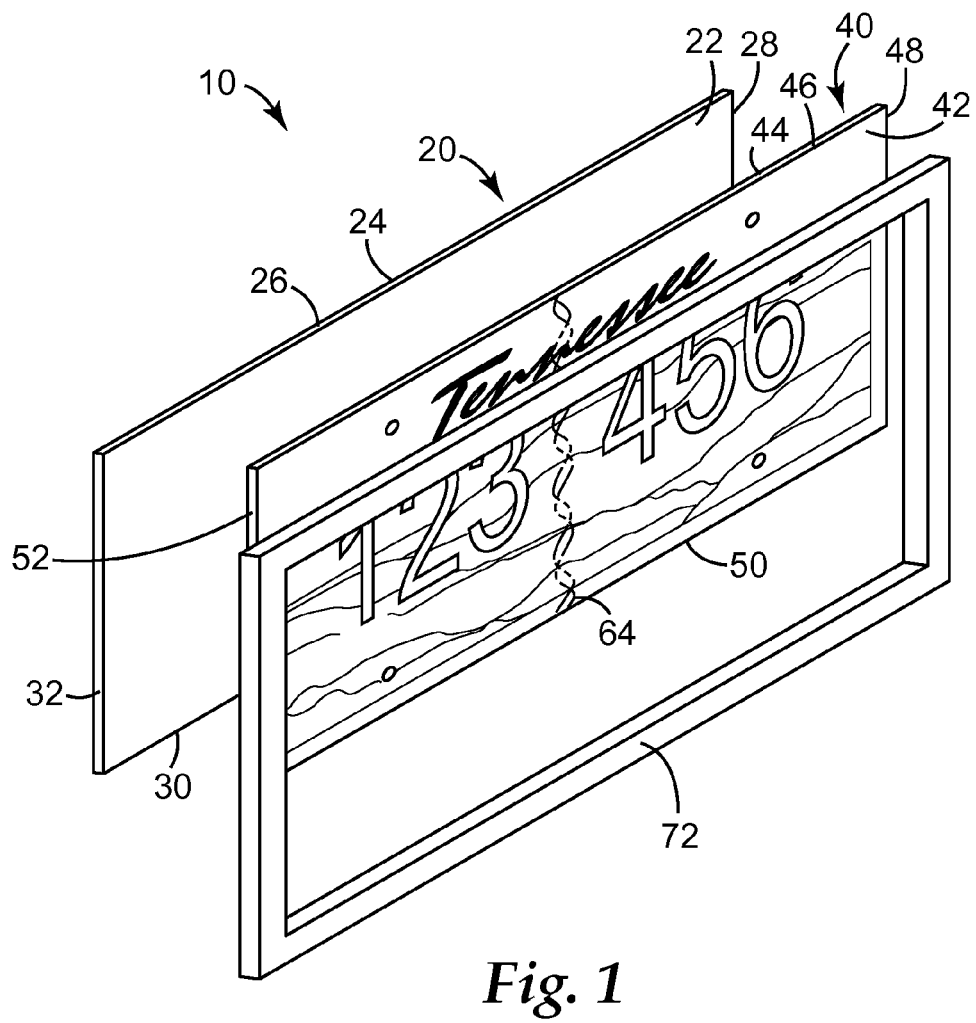
FIG. 1 is an exploded view of an exemplary motor vehicle license plate.
Figure 2:
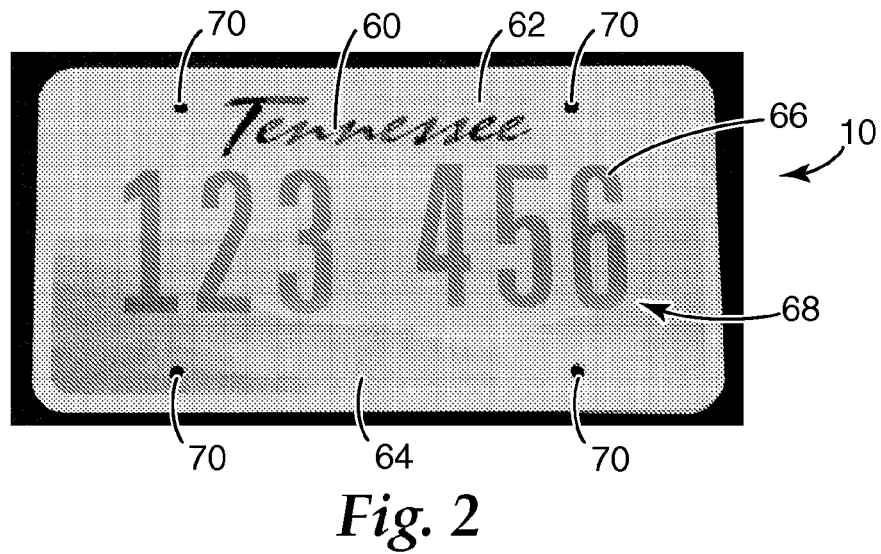
FIG. 2 is an exploded front surface view of the vehicle license plate of FIG. 1.

FIGS. 1 and 2 are, respectively, an exploded perspective view and a front surface view of an exemplary motor vehicle license plate as viewed in the visible light spectrum by, for example, a human or a digital camera. License plate 10 includes a rectangular license plate blank 20 positioned adjacent to a rectangular piece of optically active (e.g., retroreflective) sheeting 40. License plate blank 20 includes two major surfaces 22 and 24 separated by a thickness that is bound by four side surfaces 26, 28, 30, and 32. License plate blank 20 may be formed of any material having the desired rigidity, for example, metal, plastic, or wood. Retroreflective sheeting 40 includes two major surfaces 42 and 44 separated by a thickness that is bound by four side surfaces 46, 48, 50, and 52. Printed on retroreflective sheeting 40 are: a Tennessee graphic 60; "The Volunteer State" text 62; a floating security thread image 64; the alphanumeric characters "123 456" 66; and a rolling hills background graphic 68. License plate 10 also includes four holes 70 cut through retroreflective sheeting 40 and license plate blank 20 that facilitate affixation of license plate 10 to a motor vehicle by, for example, screws or rivets. This is only one exemplary affixation system and those of skill in the art will appreciate that others can be used. License plate blank 20 and retroreflective sheeting may optionally be held together and centered in the middle of frame 72.

Figure 3:
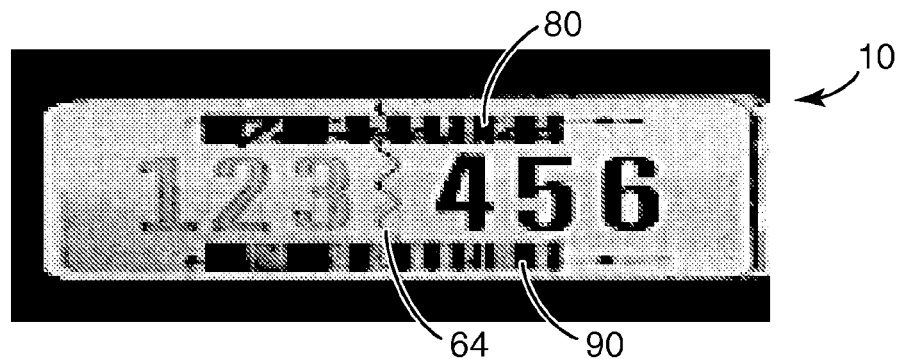
FIG. 3 is a front surface view of the license plate of FIGS. 1 and 2 shown as viewed in the near infrared spectrum.

FIG. 3 is a front surface view of the license plate of FIGS. 1 and 2 shown as viewed in the near infrared spectrum (using an LED light source emitting light in the range of between about 800 nm and about 850 nm). FIG. 3 shows that license plate 10 also includes a bar code 80 and a bar code 90. Bar code 80 overlaps graphics 60 and 62, and bar code 90 overlaps a portion of graphic 68. In the visible light spectrum, bar codes 80 and 90 are not visible while graphics 60, 62, and 68 are visible. In the near infrared light spectrum, bar codes 80 and 90 are visible.

In one exemplary implementation of the embodiment shown in FIGS. 1-3, bar codes 80 and 90 are formed by permanent or temporary attachment of one or more visibly transparent, near-infrared reflecting multilayer optical films to retroreflective sheeting 40. Such attachment may occur by, for example, use of an adhesive. The use of visibly transparent, near infrared reflecting multilayer optical films on license plate 10 causes near infrared light incident on license plate 10 to be reflected from the otherwise retroreflective light path and thus creates regions of high contrast on license plate 10 when viewed with near infrared light. The multi-layer optical films are effectively IR-reflecting mirrors with high transmission through the visible spectrum of light. Meanwhile, the image/graphics/indicia/pattern on license plate 10 remains largely unaffected by the presence of the multilayer optical film(s) when viewed with visible light. Because the visibly transparent, near-infrared reflecting multilayer optical film(s) are not significantly visible in the visible light spectrum, the image/graphics/indicia/pattern created using the multilayer optical film(s) is not visible to the human eye in the visible light spectrum. As such, the multilayer optical film(s) can be used to create covert or hidden images/graphics/indicia/patterns on a license plate that can act as vehicle identifiers in automated license plate recognition systems. Wavelength-selective multilayer optical films are a preferred material for these applications, however, other films exhibiting visibly transparent and IR reflective properties also work well.

In one exemplary implementation of the embodiment shown in FIGS. 1-3, graphics (specifically, the numbers "456") 66 are formed by adding a near infrared dye to the ink that was used to print these graphics. The use of ink including a near infrared reflecting dye on license plate 10 causes near infrared light incident on license plate 10 to be reflected from the otherwise retroreflective light path and thus creates regions of high contrast on license plate 10 when viewed with near infrared light. Consequently, the "456" graphic is visible in both the visible light spectrum and in the infrared light spectrum. Exemplary commercially available dyes include those manufactured by, for example, H.W. Sands Corporation and Epolin, Inc.

The optically active material chosen for any specific implementation will depend on the desired optical, structural, and durability characteristics. As such, desirable optically active materials will vary based on the intended application. Optically active materials include reflective and retroreflective substrates. The term "retroreflective" as used herein refers to the attribute of reflecting an obliquely incident light ray in a direction antiparallel to its incident direction, or nearly so, such that it returns to the light source or the immediate vicinity thereof. Two known types of retroreflective sheeting are microsphere-based sheeting and cube corner sheeting (often referred to as prismatic sheeting). Microsphere-based sheeting, often referred to as "beaded" sheeting, employs a multitude of microspheres typically at least partially embedded in a binder layer and having associated specular or diffuse reflecting materials (e.g., pigment particles, metal flakes, vapor coats) to retroreflect incident light. Illustrative examples are described in, for example, U.S. Pat. No. 3,190,178 (McKenzie), U.S. Pat. No. 4,025,159 (McGrath), and U.S. Pat. No. 5,066,098 (Kult). Cube corner retroreflective sheeting, often referred to as "prismatic" sheeting, comprises a body portion typically having a substantially planar front surface and a structured rear surface comprising a plurality of cube corner elements. Each cube corner element comprises three approximately mutually perpendicular optical faces. Illustrative examples are described in, for example, U.S. Pat. No. 1,591,572 (Stimson), U.S. Pat. No. 4,588,258 (Hoopman), U.S. Pat. No. 4,775,219 (Appledorn et al.), U.S. Pat. No. 5,138,488 (Szczech), and U.S. Pat. No. 5,557,836 (Smith et al.). A seal layer may be applied to the structured surface to keep contaminants away from individual cube corners. Flexible cube corner sheetings, such as those described, for example, in U.S. Pat. No. 5,450,235 (Smith et al.) can also be incorporated in embodiments or implementations of the present application. Retroreflective sheeting for use in connection with the present application can be, for example, either matte or glossy.

The infrared-reflecting material may be, for example, a multilayer optical film. The multi-layer optical film chosen for any specific implementation will depend on the desired optical, structural, and durability characteristics. As such, desirable multi-layer optical films will vary based on the intended application. Some exemplary multi-layer optical films are described in, for example, U.S. Pat. No. 6,024,455 and PCT Publication No. WO 95/17692. Exemplary commercially available multi-layer optical films include, for example, Vikuiti Clear Card Filter, Solar Reflective Film, and SM 857, all manufactured by 3M Company of St. Paul. The reflectance and transmission spectrum of a particular multi-layer optical film depends, in part, on the optical thickness of the individual layers along the various axes, and is substantially determined by the well known Fresnel coefficient. Films can be designed to reflect infrared, visible, or ultraviolet light by choice of the appropriate optical thicknesses. Films may also be designed to exhibit a spectral shift in percent reflectance and transmission as a function of entrance angle of incident light. Consequently, visibility of the infrared-reflecting material may differ based on the angle at which the optically active article is viewed. The desired relationship between refractive indices of polymeric layers can be achieved by selection of appropriate materials and appropriate processing conditions.

Alternatively or in combination, the material may include an infra-red reflecting or absorbing dye. Exemplary descriptions of such dyes may be found in, for example, U.S. Publication No. 2007/0082963. Commercially available infra-red reflecting dyes include, for example, those manufactured by H.W. Sands Corporation of Juniper, Florida and Epolin Corporation of Newark, N.J. One exemplary advantage of multi-layer optical film usage, especially multi-layer optical films with high visible light transmission, is that unlike near infra-red absorbing dyes, tinting or color change can be largely avoided or minimized.

The multi-layer optical film(s) can be temporarily or permanently attached to the optically active sheeting by, for example, lamination, bonding, mechanical affixation, or use of an adhesive.

The term "patterned" as used herein refers to a design or image, at least some of which may be information-conveying. Exemplary designs or images include, for example, indicia, patterns, alphanumeric characters, sinusoidal curves, bar codes (including, e.g., linear bar codes, two-dimensional bar codes, etc), designs, images, symbols, machine readable information, and graphics. The optically active materials may include any type of virtual indicia including, for example, sinusoidal curves, alphanumeric features, or bar codes. Exemplary security images are described, for example, in U.S. Pat. Nos. 6,288,842, D517610, and D511187.

The optically active articles described herein are ordinarily configured to include sheeting that can be applied to a given object or substrate and which incorporate various combinations of a multilayer films and patterned retroreflective layers. The articles are generally optically single-sided. That is, one side (designated the front side) is generally adapted to both receive incident light from a source and emit reflected or retroreflected light toward a detector (such as the eye of an observer), and the other side (designated the rear side) is generally adapted for application to an object such as by an adhesive layer. The front side faces the light source as well as the detector. The articles do not generally transmit significant amounts of light from the front side to the rear side, or vice versa, due at least in part to the presence of a substance or layer on the retroreflector such as a vapor coat of metal, a seal film, and/or an adhesion layer.

One use for the optically active articles described herein is in license plates that are detected by a license plate detection or recognition system. One exemplary license plate detection system uses a camera and a lighting system to capture license plate images. An image of the scene including the license plate can be made from ambient lighting and from light added by a designated light source (for example, coaxial lighting that directs light rays onto the license plate when the camera is preparing to record an image). The light rays emitted by the coaxial lighting in combination with the retroreflective properties of the license plate create a strong, bright signal from the location of the plate in the otherwise large image scene. The bright signal is used to identify the location of the license plate. Then, the automatic license plate recognition (ALPR) focuses on the region of interest (the region of brightness) and searches for matches to expected indicia by looking for recognizable patterns of contrast. The recognized indicia are often provided with some assessment of the confidence in the match to another computer or other communication device for dispatching the information about the observed license plate.

The light detected by the camera can come from any of a number of sources. Of particular interest is the light reflected from the license plate and the amount of light reflected from each area inside that region of interest on the license plate. The camera or detection system collects light from each region of the license plate with the goal of creating a difference (contrast) between each indicia on the license plate. Contrast can be effected in numerous ways, including the use of coaxial lighting to overwhelm the amount of light coming from ambient light sources. The use of filters on the camera can help accentuate the differences between the indicia and background by selectively removing undesired portions of the light spectrum and passing only the desired portions of the light spectrum.

The light in the driving and ALPR environment can be divided into the following spectral regions: visible light in the region between about 400 and about 700 nm and infrared light in the region between about 700 and about 1100 nm. Typical cameras have sensitivity that includes both of these ranges, although the sensitivity of a standard camera system decreases significantly for wavelengths longer than 1100 nm. Various light emitting diodes (LEDs) can emit light over this entire wavelength range, and typically most LEDs are characterized by a central wavelength and a narrow distribution around that wavelength. For example, in a system including LEDs emitting light rays having a wavelength of 830 nm±20 nm, a suitably equipped camera could detect a license plate in the near infrared spectrum with light not visible to the driver of the vehicle. Thus the driver would not see the "strobe" light effect of the LEDs and would not be distracted by them.

The cameras and lights for these systems are typically mounted to view the license plates at some angle to the direction of vehicle motion. Exemplary mounting locations include positions above the traffic flow or from the side of the roadway. Images are typically collected at an angle of 20 degrees to 45 degrees from normal incidence (head-on) to the license plate.

A detector which is sensitive to infrared or ultraviolet light as appropriate would be used to detect retroreflected light outside of the visible spectrum. Exemplary cameras include those sold by PIPS Corporation of Knoxville, Tenn., including but not limited to the P372.

The retroreflective articles described herein can be used to improve the capture efficiency of these license plate detection or recognition systems. Capture efficiency can be described as the process of correctly locating and identifying license plate data, including, but not limited to, indicia, plate type, and plate origin. Applications for these automated systems include, but are not limited to, electronic toll systems, red light running systems, speed enforcement systems, vehicle tracking systems, trip timing systems, automated identification and alerting systems, and vehicle access control systems. As is mentioned above, current automatic license plate recognition systems have capture efficiencies that are lower than desired due to, for example, low or inconsistent contrast of indicia as well as obscuring or distracting contrast of artwork and/or indicia on the license plate.

The optically active articles of the present application may also be used in signage. The term "signage" as used herein refers to an article that conveys information, usually by means of alphanumeric characters, symbols, graphics, or other indicia. Specific signage examples include, but are not limited to, signage used for traffic control purposes, street signs, identification materials (e.g., licenses), and vehicle license plates. It would advantageous in some applications to use the articles of the present application to employ the desirable property of viewing indicia without changing the appearance of a signage under visible light. Such retroreflective articles would enable the reading of signage specific information meant for general consumption while avoiding driver or sign reader distraction by and/or unwanted detection of "covert" markings. Such a development facilitates inconspicuous marking of and/or signaling by articles for security purposes, identification, and inventory control. That inconspicuousness can be created with, for example, a visibly clear multi-layer optical film or a multi-layer optical film having a color that approximates the color of the signage substrate. The covert indicia could assist in signage inventory control, as is described in, for example, PCT Publication No. WO 96/35196. For example, the covert indicia could contain signage-specific information such as, for example, signage material lot number, installation date, reorder information, or product life expectancy.

For example, a retroreflective highway sign could include an infra-red reflecting indicia attached to the retroreflective sheeting portion of the sign. Such attachment could occur, for example, during production, at the time of installation, or after installation. One advantage of such a sign is that the indicia does not interfere with the drivers fast reading of the sign as the driver drives past the sign because the indicia is not visible to the driver. But the indicia can be viewed by highway personnel or machines outfitted with an infrared camera. This identification can be used, for example, for maintenance of the sign, logging of service life, reordering, or to measure sign performance based on the information in the indicia.

Objects and advantages of the present application are further illustrated by the following examples, but the particular materials and amounts thereof recited in the examples, as well as other conditions and details, should not be construed to unduly limit the invention, as those of skill in the art will recognize that other parameters, materials, and equipment may be used. All parts, percentages and ratios herein are by weight unless otherwise specified.

EXAMPLE 1

A roll of white reflective sheeting having a security feature embedded therewith and pressure sensitive adhesive coated on the backside of the type commercialized by 3M Company, Minnesota, under the designation "Digital License Plate (DLP) Sheeting Series 9250T" with "Ensure™ Virtual Security Thread" was printed using thermal mass transfer printing techniques on the digital license plate system described in U.S. Pat. No. 6,712,532 (Look); U.S. Pat. No. 6,246,428 (Look et al); U.S. Pat. No. 5,818,492 (Look); U.S. Pat. No. 5,508,105 (Orensteen et al); and U.S. Pat. No. 4,847,237 (Vanderzanden). The printed pattern formed a rolling hills background graphic 68, as is shown in FIGS. 1-3. In this example, the license plate bore the word "Tennessee" 60 horizontally centered across its upper portion, and the words "The Volunteer State" 62 in smaller letters above the word "Tennessee." The printed sheeting was then laminated with "Clear Protective Film 9097" film commercialized by 3M Company.

The printed reflective sheeting was applied to a 6 inch by 12 inch (15 cm by 30 cm) aluminum substrate (e.g., license plate blank 20) with a squeeze roll to form license plate 10. The characters "123 456" were adhered to the license plate using "Scotch Double Stick Tape" pressure-sensitive adhesive tape, manufactured and sold by 3M Company. The "123" portion of the graphics were formed of Perrindo Red 12R1412D manufactured by Penn Color diluted with an equal weight of methyl ethyl ketone (MEK). The "456" portion of the graphics were formed of a mixture of 25 g. of Perrindo Red 12R1412D manufactured by Penn Color; 25 g. of cyclohexanone; and 0.5 g. Epolin 5588 (an infrared reflecting dye).

The bar code indicia was formed by placing lengthwise alternating rectangular pieces of "Vikuiti Clear Card Filter" multilayer IR-reflecting film, manufactured and sold by 3M Company, and rectangular pieces of a polyester film, commercialized by 3M Company under the designation "Dual-Purpose Transparency Film CG5000." In this particular example, four rectangular pieces 1 inch (25 mm) wide of the multilayer film were provided with the following lengths: 0.7 inch (18 mm), 0.35 inch (9 mm), 0.24 inch (6 mm), and 0.12 inch (3 mm). Four rectangular pieces of the polyester film with the same dimensions were also provided. The indicia pattern was created by alternating the rectangular pieces of material with the polyester pieces of material, starting with the longest pieces of multilayer film (0.7 inch (18 mm)) and polyester film and continuing in decreasing length order.

The "Vikuiti Clear Card Filter" multilayer IR-reflecting film is tailored to specularly reflect infrared (IR) radiation, therefore preventing it from retroreflecting incident light. In contrast, the polyester film allows IR radiation to be retroreflected. When viewed with near-IR illumination conditions (800-850 nm), the indicia resembles a barcode 80 with the pieces of multilayer film appearing dark and the pieces of polyester film retroreflecting IR and appearing brighter. The barcode was positioned over the word "Tennessee," on the upper portion of the license plate and was held in place by "Scotch Double Stick Tape" pressure-sensitive adhesive tape. The indicia pattern/barcode was visibly transparent to the naked eye and was therefore inconspicuous to the general public in the vicinity of the license plate. The background graphics as well as the word "Tennessee" were visible through the barcode.

An additional indicia was created by providing an identical barcode pattern 90 of alternating rectangular pieces of a second multilayer IR-reflecting film, commercialized by 3M Company, under the designation "CM 875" and the polyester film mentioned above. The second barcode indicia was placed on the lower portion of the license plate, below the numbers "123 456," and was secured by "Scotch Double Stick Tape" pressure-sensitive adhesive tape.

Those of skill in the art will appreciate that the graphics or indicia can be printed directly on or attached to the optically active material. Such printing may be effected, for example, with a thermal printer.

An image of the assembled license plate was captured with a "P372" or "Spike Plus" charge-coupled device (CCD) camera with high infra-red sensitivity and infra-red-light-emitting diodes (LEDs), commercialized by PIPS Technology Inc. of Tennessee, U.S.A. The camera was fitted with 35 mm lens. The output of the LEDs on the camera was measured with a "USB2000" spectral detector and related "OOI-Base32" Spectrometer Operating Software, manufactured and sold by Ocean Optics Inc. of Florida, U.S.A. The peak intensity of output was observed to be about 830 nm. The assembled license plate was placed at approximately 42 ft (12.8 m) from the camera on a support with vertical inclination of approximately 10°.

EXAMPLE 2

Figure 4:
FIG. 4 is a schematic representation of the license plate of Example 2.

A license plate was provided as described in Example 1, except (1) the background graphic was a wooded lake scene; (2) the words "Explore Minnesota" were printed across the upper portion of the license plate; and (3) the words "10,000 Lakes" were printed across the lower portion of the license plate. In the approximate center of the license plate, the alphanumeric characters "NSTIG8R" were printed on the approximate center of the license plate. FIG. 4 is a schematic representation of this license plate.

In this example, indicia were created by centering three 0.5 inch by 0.5 inch (1.3 cm by 1.3 cm) square pieces of "Vikuiti Clear Card Filter" multilayer film vertically on the right side of the license plate. The square indicia were affixed to the license plate by the pressure-sensitive adhesive tape of Example 1 and were applied using hand pressure.

A "DSC-S85" digital camera, manufactured and sold by Sony Corporation of Tokyo, Japan, was used to capture images of the license plate under near infrared light conditions. The camera was disassembled and the IR block filter was replaced with an "1146-0 IRT" near-IR (NIR) visible radiation blocking filter manufactured by Cyro Industries of New Jersey, U.S.A. The visible blocking filter was of equal size and thickness as the original IR blocking filter. The image taken with this camera is shown in FIG. 5A.

Visible light images were also captured under ambient conditions using an "A2" digital camera (also manufactured by Konica Minolta of Tokyo Japan) with an instantaneous flash, thereby facilitating observation of the retroreflective properties of the reflective sheeting. The image taken with this camera is shown in FIG. 5B. For both of these images, the license plate assembly was placed on a support with vertical inclination of approximately 30°.

EXAMPLE 3

A license plate was provided as described in Example 1, except that the white reflective sheeting remained unprinted. Indicia were created and vertically centered on the license plate in the following order: (1) a first indicia formed from the commercially available multilayer IR-reflecting film "CM 875" in the shape of a radial barcode was placed on the license plate; (2) a second indicia formed from the commercially available multilayer IR reflecting film "Solar Reflecting Film" commercialized by 3M Company was placed on the of the license plate in the shape of the letters "I" and "R"; and (3) a third indicia in the shape of the letter "T" was adhered on the license plate and was formed from the commercially available, visually transparent pressure-sensitive adhesive tape "Scotch Magic Tape," commercialized by 3M Company. FIG. 6 is a schematic representation of this license plate.

A rectangular polyethylene terephthalate (PET) film having dimensions of 6 inches by 12 inches (15.2 cm by 30.5 cm) was placed over the license plate with the indicia mounted thereon for the purpose of protecting the indicia when handling the license plate. The assembly was then placed on a conveyor belt of a "RB 230D" hot-stamping machine, manufactured and sold by UTSCH AG of Siegen, Germany. The temperature of the roll was set to 150° C., and the stamping arm of the equipment was lowered until it contacted the license plate. The conveying belt was advanced under the heated roll, and the license plate assembly was carried through the hot-stamping equipment, causing the indicia to be lightly adhered to the license plate. The PET film was removed after lamination.

Images of the license plate assembly under ambient conditions and under IR conditions were captured with, respectively, "A2" digital camera and "PIPS 372" camera. The samples were placed on a horizontal surface for convenience when capturing visible light images under ambient conditions. The samples were subsequently placed in an almost vertical position, leaning against a support, for capturing images under IR conditions. The indicia are visibly transparent but appear dark under near-IR conditions, therefore creating contrast in infrared radiation. The image under IR conditions is provided in FIG. 7.

Those having skill in the art will appreciate that many changes may be made to the details of the above-described embodiments and implementations without departing from the underlying principles thereof. The scope of the present application should, therefore, be determined only by the following claims.

What is claimed is:

1. An optically active article, comprising:
an infrared-reflecting material positioned adjacent to an optically active substrate such that the infrared-reflecting material forms a pattern that can be read by an infrared sensor when the optically active article is illuminated by an infrared light source;
wherein the infrared-reflecting material is transparent to visible light, and wherein the optically active substrate is at least one of reflective or retroreflective.

2. The optically active article of claim 1, wherein the retroreflective substrate includes prismatic sheeting or beaded sheeting.

3. The optically active article of claim 1, wherein the infrared-reflecting material is a multilayer optical film.

4. The optically active article of claim 1, further comprising an underlying pattern that is visible in the visible light spectrum through the optically active substrate.

5. The optically active article of claim 1, wherein the pattern includes at least one of machine readable information, graphics, images, alphanumeric characters, bar codes, or other indicia.

6. The optically active article of claim 1, wherein the visibility of the pattern differs based on the angle at which the optically active article is viewed.

7. The optically active article of claim 1, wherein the article is a signage selected from a group consisting essentially of a license plate, a validation sticker, a usage permit, an identification label, or a tag.

* * * * *